Dec. 25, 1956 R. H. SWART 2,775,494
PISTON CONSTRUCTION
Filed April 16, 1953
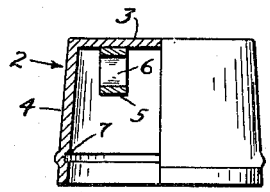
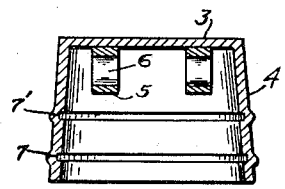
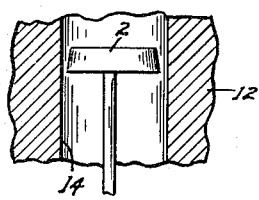
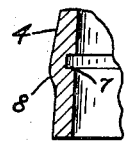
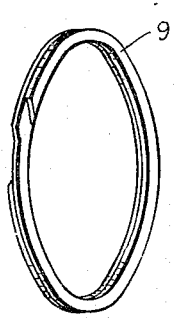
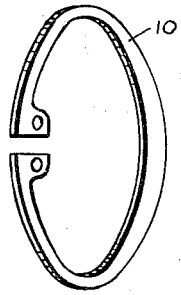
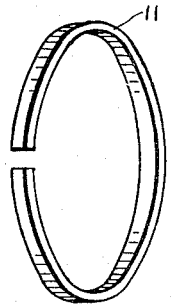
INVENTOR.
Richard H. Swart
BY United States Patent Office 2,775,494
Patented Dec. 25, 1956

2,775,494

PISTON CONSTRUCTION

Richard H. Swart, Syracuse, N. Y., assignor to Carrier Corporation, Syracuse, N. Y., a corporation of Delaware Application April 16, 1953, Serial No. 349,138

3 Claims. (Cl. 309—12)

This invention relates to a piston for use in reciprocating machinery such as a reciprocating refrigerant compressor and, more particularly, to a piston having a skirt of frusto-conical contour.

Heretofore, piston rings for use in cylinders of reciprocating refrigerant compressors and similar devices have been disposed in the wall of the cylinder. Where the piston is made of a material having a high rate of expansion, such as aluminum, this type of construction has required a relatively loose fit between the piston and the wall of the cylinder when the compressor is starting thus reducing the efficiency and capacity of the compressor.

The chief object of this invention is to provide a piston construction that eliminates the use of piston rings in the walls of piston cylinders.

An object of the invention is to provide a compressor whose cylinder and piston have a close fit where the piston is made of a material that has a high rate of expansion.

Another object is to provide a better system of lubrication between the cylinder and piston walls. Other objects of my invention will be readily perceived from the following description.

This invention relates to a compressor having a cylinder, a piston movable in the cylinder, and means disposed within the piston to expand the piston wall to form a protuberance on the outer side of the piston wall.

This invention also relates to the method of fabricating a piston having an uninterrupted exterior surface and a groove in the inner side of the piston wall which consists of the steps of contracting an expansible means, inserting the expansible means within the piston, placing the expansible means in the groove, and releasing the expansible means to force the outer side of the piston wall outward to form a protuberance therein.

The attached drawing discloses a preferred embodiment of my invention, in which

Figure 1 is a view partly in section and partly in elevation of a piston embodying the present invention;

Figure 2 is an enlarged view in section of the expanding ring and the piston wall;

Fig. 3 is a sectional view of a piston having a modified construction;

Figure 4 is a sectional view of a portion of a compressor including the piston of the present invention;

Figure 5 is an isometric view of one type of ring employed in the present invention;

Figure 6 is an isometric view of another type of ring employed in the present invention; and Figure 7 is an isometric view of a third type of ring employed in the present invention.

Referring to the drawing, there is shown a piston 2 having a head 3 and skirt 4. This head and skirt are preferably an integral body formed by a suitable drawing operation, but the head and skirt could be separable parts joined together by suitable means. Attached to the head 3 is a pair of pin lugs 5. These pin lugs have openings 6 therein to permit a wrist pin of an eccentric strap to be connected to the pin lugs. While I have shown the pin lugs as separate members, it will be understood that this support means could be made from a U-shaped member or other suitable structure. The details of the piston are more fully described and disclosed in the joint copending application of Robert W. Ayling and myself, Serial No. 349,139, filed April 16, 1953, now Patent No. 2,752,213, June 26, 1956.

A groove 7 is provided in the inner wall of the skirt 4. Within the groove 7, a ring having the tendency to expand is disposed. It will be understood that suitable means other than a groove may be used in which the ring is to be disposed. This spring ring may be of any desired type provided it will expand when placed in the grooves 7 so as to spring the skirt 4 so that it tapers from the head 3 at least to the point of the ring. This ring forms a slight protuberance 8 in the outer wall of the skirt 4 as shown in Figure 3, opposite the point where it is disposed in the groove 7. The protuberance 8 will function in effect as a piston ring and eliminate the need of the piston or compression ring in the wall of the compressor cylinder. The tapering of the skirt 4 from the head 3 along with the protuberance 8 forms a wedge shaped oil film between the piston and the cylinder.

Figures 5, 6 and 7 disclose three types of expanding rings that may be employed to provide the protuberance 8 and the tapering of the skirt 4.

The ring 9 of Figure 5 is an annulus of constant width. The ends of the ring 9 are in different planes but it is noted that a continuous annulus is formed.

The ring 10 of Figure 6 is an annulus of varying width. The ends of the ring do not meet and are in the same plane so that a continuous annulus is not formed. The width of the annulus is greatest at the point diametrically opposite where the two ends of the ring 10 are separated.

A third type of ring that may be employed is the ring 11 of Figure 7. This ring is an annulus of constant width but the ends are spaced apart and in the same plane. This type of ring is currently used in compressors to form the piston or compression ring in the wall of the cylinder.

The ends of the rings of Figures 5, 6 and 7 are separated to permit the ring to be compressed to be placed in a member of less diameter, such as the groove 7. Thus, when any of the rings 9, 10 and 11 are disposed within the groove 7, expansion of ring upon release forces the exterior surface of the skirt 4 outwardly to provide a protuberance 8 and to taper the skirt 4 so as to make the skirt have a frusto-conical contour between the protuberance 8 and the head 3 of the piston 2.

It will be noted that in the embodiment shown in Figure 1 the groove 7 is placed in the lowermost portion of the skirt 4. This permits a longer sealing surface. One ring is sufficient unless high pressures are encountered.

A piston satisfactory for use when high pressures are encountered is shown in Figure 3. This piston includes two grooves and two rings. The second groove 7' is placed between the lowermost edge of the pin lugs 5 and the groove 7. It will be noted that the use of two rings will eliminate any tendency of the piston to wobble in the cylinder.

Either of the pistons may be employed in a compressor 12, a portion of which is shown in Figure 4. The piston 2 reciprocates in the cylinder 14 of the compressor 12 in a well-known manner.

This invention has the advantage of permitting the use of a material with a high rate of expansion that is light in weight, such as aluminum, in the piston of a compressor and yet maintaining a relatively close fit between the cylinder and piston when the compressor is starting.

While I have described a preferred embodiment of my invention, it will be understood that my invention is not limited thereto since it may be otherwise embodied within the scope of the following claims.

I claim:

1. In combination with a compressor having a cylinder, a piston movable in the cylinder, said piston having a thin metal wall with an uninterrupted exterior surface and pin support means disposed inside the wall, said pin support means being adapted to serve as bearings for a wrist pin that is attached to an eccentric strap, said wall having a groove in its inner side, and means disposed in the groove to force the wall outward to form a protuberance on the outer side of the wall.

2. A piston according to claim 1 in which the groove is located adjacent the lower edge of the wall.

3. In combination with a compressor having a cylinder, a unitary metallic piston movable in the cylinder, the piston having an uninterrupted exterior surface, spring means disposed within the piston to force the piston wall outward to form a protrusion in the outer side of the piston wall.

References Cited in the file of this patent

UNITED STATES PATENTS

| | | |
|---|---|---|
| 984,250 | Wiesner | Feb. 14, 1911 |
| 1,000,759 | Schow | Aug. 15, 1911 |
| 1,273,737 | Christenson | July 23, 1918 |
| 1,469,087 | Hewitt | Sept. 25, 1923 |
| 1,513,272 | Pourroy | Oct. 28, 1924 |
| 1,537,851 | Maingault | May 12, 1925 |
| 1,845,812 | Price | Feb. 16, 1932 |
| 1,997,129 | Taylor | Apr. 9, 1935 |
| 2,027,872 | Moeller | Jan. 14, 1936 |
| 2,073,499 | Solenberger | Mar. 9, 1937 |
| 2,077,906 | Stevens | Apr. 20, 1937 |
| 2,113,585 | Flammang et al. | Apr. 12, 1938 |
| 2,274,806 | Phillips | Mar. 3, 1942 |
| 2,539,903 | Gruetjen | Jan. 30, 1951 |

FOREIGN PATENTS

| | | |
|---|---|---|
| 119,385 | Germany | Apr. 11, 1901 |
| 309,376 | Italy | July 4, 1933 |